United States Patent
Hinton (10) Patent No.: US 9,192,098 B2
(45) Date of Patent: Nov. 24, 2015

(54) AGRICULTURAL DEVICE FOR REMOVING CROP REMNANTS

(71) Applicant: Theodore B. Hinton, Hiawatha, KS (US)

(72) Inventor: Theodore B. Hinton, Hiawatha, KS (US)

( * ) Notice: Subject to any disclaimer, the term of this patent is extended or adjusted under 35 U.S.C. 154(b) by 20 days.

(21) Appl. No.: 14/101,670

(22) Filed: Dec. 10, 2013

(65) Prior Publication Data

US 2014/0174769 A1    Jun. 26, 2014

Related U.S. Application Data

(60) Provisional application No. 61/739,988, filed on Dec. 20, 2012.

(51) Int. Cl.
*A01D 34/835* (2006.01)

(52) U.S. Cl.
CPC .................. *A01D 34/8355* (2013.01)

(58) Field of Classification Search
CPC ..... A01D 25/04; A01D 25/044; A01D 25/00; A01D 33/00; A01D 34/8355; A01D 82/02
USPC ................................................ 171/50, 53, 58
See application file for complete search history.

(56) References Cited

U.S. PATENT DOCUMENTS

| | | | | |
|---|---|---|---|---|
| 794,318 A | * | 7/1905 | Schmitt | 171/53 |
| 988,405 A | * | 4/1911 | Sweeney | 171/58 |
| 1,315,381 A | * | 9/1919 | Merchant | 171/53 |
| 2,472,386 A | * | 6/1949 | Schmeiser | 172/248 |
| 2,513,165 A | * | 6/1950 | Gilreath | 172/545 |
| 2,537,802 A | * | 1/1951 | Yeppie | 172/548 |
| 2,538,167 A | * | 1/1951 | Schmeiser | 172/545 |
| 2,657,619 A | * | 11/1953 | Gilreath | 172/179 |
| 3,192,838 A | * | 7/1965 | Cook | 404/132 |
| 3,338,315 A | * | 8/1967 | Louis | 172/537 |
| 3,392,791 A | * | 7/1968 | Orthman | 172/105 |
| 3,897,830 A | * | 8/1975 | van der Lely | 172/68 |
| 4,339,004 A | * | 7/1982 | van der Lely et al. | 172/537 |
| 4,919,211 A | | 4/1990 | Cope | |

OTHER PUBLICATIONS http://www.dlindustires.net/Products/ChopperStalker.htm, 2 pages, published at least as early as Dec. 19, 2012.
http://www.orthmanag.com/Products/pre-plant-residue-mgmt/stalkpuller, 3 pages, published at least as early as Dec. 19, 2012.

* cited by examiner

*Primary Examiner* — Matthew D Troutman
(74) *Attorney, Agent, or Firm* — Klintworth & Rozenblat IP LLC (57) ABSTRACT

Agricultural devices and methods of operating the same are provided. In one aspect, an agricultural device includes a frame including a hitch and a roller assembly coupled to the frame. The roller assembly includes an outer roller and an inner roller. The outer roller includes a pair of end plates and a plurality of spaced-apart engagement members extending between and coupled to the end plates. Each of the engagement members include an inner edge extending into the outer roller and the outer roller is rotatably coupled to the frame. The inner roller is positioned in the outer roller and includes a pair of end plates and an exterior surface extending between the end plates. The inner roller is rotatably coupled to the outer roller and the inner edges of the engagement members are adapted to be positioned proximate the exterior surface of the inner roller.

20 Claims, 7 Drawing Sheets

FIG. 7

AGRICULTURAL DEVICE FOR REMOVING CROP REMNANTS

RELATED APPLICATIONS

The present application claims the benefit of U.S. Provisional Patent Application No. 61/739,988, filed Dec. 20, 2012, the entire contents of which are incorporated herein by reference.

FIELD OF THE INVENTION

The present disclosure generally relates to agricultural devices and, more particularly, to agricultural devices for removing crop remnants from soil.

BACKGROUND

Recently, no-till farming has become more popular. No-till farming requires that the soil remain untilled subsequent to harvesting of crops from the field. For example, a combine harvests corn from a field by cutting corn stalks a distance above the soil. No-till farming leaves the uncut portion of the corn stalks in the soil in order to achieve minimal soil disturbance. Some believe no-till farming has benefits and its adoption has grown steadily over the years. However, leaving remnant stalks in the soil after harvest have several deleterious effects.

One such deleterious effect is the damage the remaining un-cut stalks cause to tires of agricultural devices such as tractors, implements pulled behind tractors, etc. In some cases, remnant stalks accelerate the wear of tires. For example, tires may normally have a 5 or 6 year life when not exposed to remnant stalks. However, remnant stalks can decrease the life of a tire to 2 or 3 years. This decrease in life can be a substantial financial burden. Tires for agricultural devices can range from several hundreds of dollars to $5000 or even more, and many agricultural devices include numerous tires. As can be seen, tire costs are quite substantial and decreasing the life of a tire by 50% or more creates an added financial burden.

No-till farming can also decrease crop yield. Remnant crop stalks include the portion of the stalk above the soil and the root mass or root ball beneath the soil. When planting crops into the remnant crop stalks, the remnant stalks can create air pockets in a seed trench, cause shallow or inconsistent depth of seed placement, and/or poor seed-to-soil contact. All of these factors and others can delay plant emergence from the seed or may prohibit growth altogether, thereby greatly reducing crop yield.

SUMMARY

It is therefore desirable to provide an agricultural device that resolves one or more of the above-referenced and other deficiencies In one aspect, an agricultural device is provided and includes a frame including a hitch and a roller assembly coupled to the frame. The roller assembly includes an inner roller and an outer roller. The outer roller includes a pair of end plates and a plurality of spaced-apart engagement members extending between and coupled to the end plates. Each of the engagement members includes an inner edge extending into the outer roller and the outer roller is rotatably coupled to the frame. The inner roller is positioned in the outer roller and includes a pair of end plates and an exterior surface extending between the end plates. The inner roller is rotatably coupled to the outer roller and the inner edges of the engagement members are adapted to be positioned proximate the exterior surface of the inner roller.

In one aspect, the inner edges of the engagement members are at least partially serrated.

In one aspect, the inner edges of the engagement members engage the exterior surface of the inner roller.

In one aspect, the inner edges of the engagement members engage the exterior surface of the inner roller toward a rear of the roller assembly.

In one aspect, the exterior surface of the inner roller is at least partially made of a resilient material.

In one aspect, the outer roller rotates about a first axis and the inner roller rotates about a second axis offset from the first axis.

In one aspect, the second axis is positioned below and to a rear of the first axis based on a direction of travel of the agricultural device.

In one aspect, the agricultural device further includes a lift mechanism coupled to the frame and the roller assembly to vertically move the roller assembly.

In one aspect, the lift mechanism moves the roller assembly between an operating position, in which the outer roller engages soil, and an inoperative position, in which the outer roller is positioned above and out of contact with the soil.

In one aspect, the agricultural device further includes a travel wheel rotatably coupled to the frame and adapted to engage a ground surface.

In one aspect, the agricultural device further includes a lift mechanism coupled to the travel wheel to move the travel wheel vertically into and out of contact with a ground surface.

In one aspect, an agricultural device is provided and includes a frame including a hitch, and a roller assembly coupled to the frame. The roller assembly includes a first roller defining an internal cavity and including at least one engagement member. The engagement member includes an inner edge extending into the internal cavity of the first roller, and the first roller has a first diameter and is rotatably coupled to the frame. The roller assembly also includes a second roller at least partially positioned in the internal cavity of the first roller and includes an exterior surface. The first roller is rotatably coupled to the second roller and the inner edge of the engagement member is adapted to be positioned proximate the exterior surface of the second roller. The second roller has a second diameter smaller than the first diameter.

In one aspect, the first roller includes a plurality of engagement members and each of the plurality of engagement members include an inner edge, and wherein inner edges of the plurality of engagement members are adapted to be positioned proximate the exterior surface of the second roller.

In one aspect, the inner edge of the engagement member is at least partially serrated.

In one aspect, the inner edge of the engagement member engages the exterior surface of the second roller.

In one aspect, the inner edge of the engagement member engages the exterior surface of the second roller toward a rear of the roller assembly.

In one aspect, the exterior surface of the second roller is at least partially made of a resilient material.

In one aspect, the first roller rotates about a first axis and the second roller rotates about a second axis offset from the first axis.

In one aspect, the second axis is positioned below and to a rear of the first axis based on a direction of travel of the agricultural device.

In one aspect, the second roller is one of a plurality of second rollers, wherein each of the plurality of second rollers include an exterior surface that is adapted to be positioned proximate the inner edge of the engagement member.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
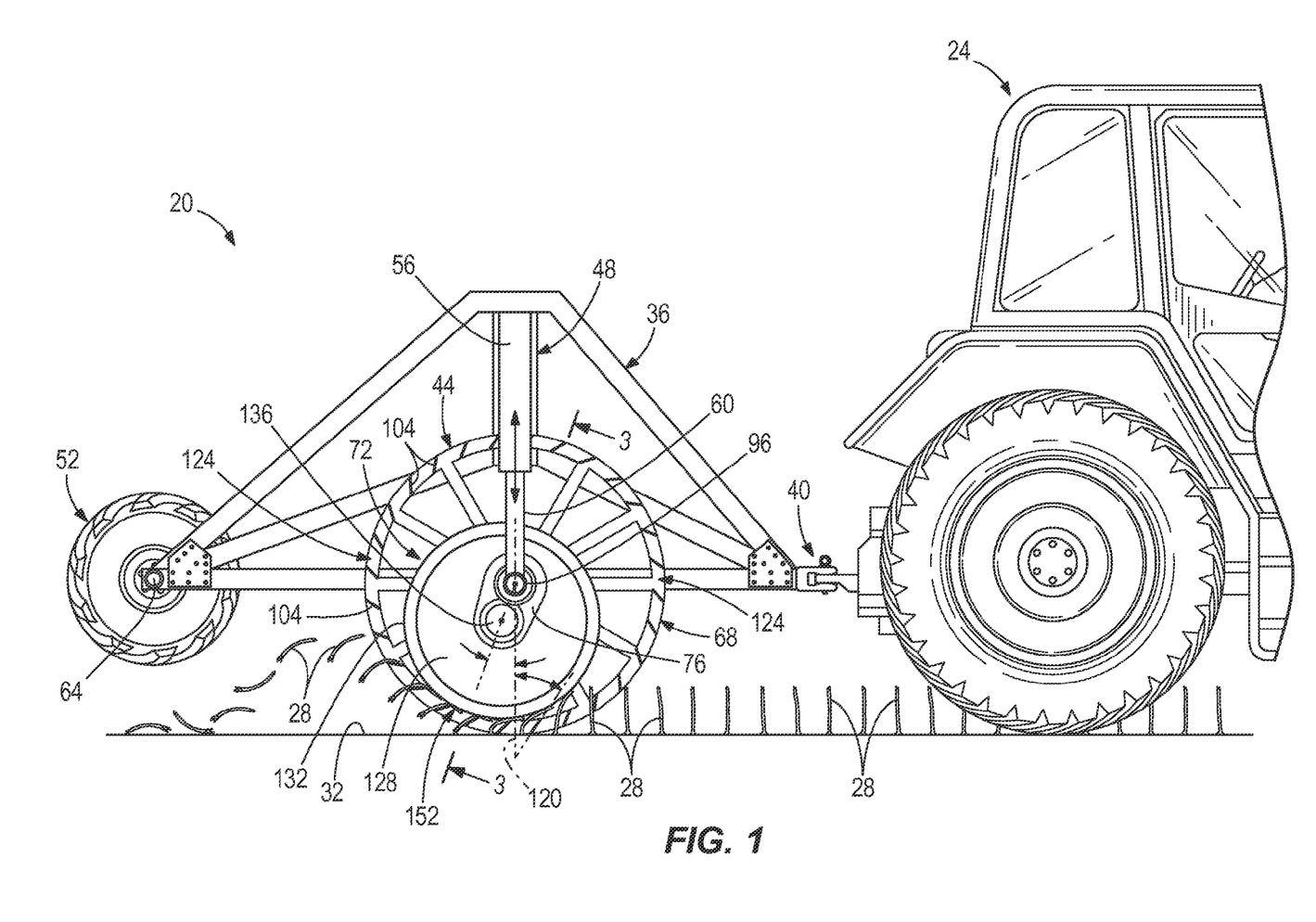
FIG. 1 is an elevational view of an exemplary agricultural device including principles of the disclosure, the agricultural device is being pulled by an exemplary tractor, in accordance with one embodiment.

With reference to FIG. 1, an exemplary embodiment of an agricultural device 20 is illustrated. An exemplary tractor 24 for pulling the agricultural device 20 is also illustrated. The agricultural device 20 is adapted to remove or pull un-cut, remnant crop stalks 28 (including both the portion above the soil and the root mass or root ball beneath the soil) from the soil 32 in an agricultural crop field. Such remnant stalks 28 are left behind after the crop is harvested from a field. Moreover, the agricultural device 20 is adapted to remove the remnant crop stalks 28 in a relatively gentle manner with minimal disturbance to the soil 32. The agricultural device 20 crushes, splinters, punctures, or otherwise deteriorates the remnant stalks 28 to accelerate decomposition of the remnant stalks 28. The agricultural device may be used to remove remnant stalks associated with a wide variety of crops and all of such crop possibilities are intended to be within the spirit and scope of the present disclosure. One example of a crop includes corn.

In the illustrated exemplary embodiment, a single agricultural device 20 is pulled behind a tractor 24 after a crop has been harvested from the crop field. In other exemplary embodiments, the agricultural device 20 may be pulled behind a harvesting device, such as, for example, a combine, during the harvesting process. In this alternative embodiment, the crop field is traversed only a single time to perform both harvesting and removal of remnant crop stalks 28. In yet other alternative embodiments, a plurality of agricultural devices 20 may be pulled behind a tractor or behind a harvesting device.

Returning to the illustrated exemplary embodiment, the agricultural device 20 includes a frame 36 including a hitch or coupling member 40 for coupling to the tractor 24, a roller assembly 44 coupled to the frame 36, a lift mechanism 48 coupled to the roller assembly 44 for vertically moving the roller assembly 44, and a travel wheel 52 adapted to selectively engage a ground surface (e.g., soil, roadway, etc.) when the agricultural device 20 is not operating.

The frame 36 can have a variety of configurations. In the illustrated exemplary embodiment, the frame 36 includes the hitch 40 at a front thereof and the travel wheel 52 at the rear thereof. The lift mechanism 48 is coupled to and supported by the frame 36 between the hitch 40 and the travel wheel 52. The lift mechanism 48 can be a wide variety of different types of mechanisms adapted to vertically move the roller assembly 44. In the illustrated exemplary embodiment, the lift mechanism 48 includes a lift housing 56, and a coupling arm 60 coupled to the roller assembly 44 and moveable within and along the lift housing 56. The coupling arm 60 may be powered in a variety of different manners, all of which are intended to be within the spirit and scope of the present disclosure. For example, the coupling arm 60 may be powered for movement by hydraulics, pneumatics, screw drive, or any other type of power capable of moving the coupling arm 60 relative to the lift housing 56.

The lift mechanism 48 is adapted to move the roller assembly 44 from an operating position, in which the roller assembly 44 engages the soil 32 and removes the remnant stalks 28, to a travel position, in which the roller assembly 44 is moved upward out of engagement with the soil 32 to a height where a bottom of the roller assembly 44 is positioned above a bottom of the travel wheel 52 to enable engagement of the travel wheel 52 with the soil 32 or other ground surface. Alternatively, in the operating position of the roller assembly 44, the roller assembly 44 may be spaced above the soil 32 and engage the remnant stalks 28. When the roller assembly 44 is not is use and/or is traveling on surfaces other than crop fields, it may be desirable to have the travel wheel 52 contact the ground surface instead of the roller assembly 44. This inhibits the roller assembly 44 from prematurely wearing out or being damaged. The travel wheel 52 is coupled to the frame 36 via a travel wheel axle 64. In the illustrated exemplary embodiment, the device 20 includes a single travel wheel 52. In other embodiments, the device 20 includes a plurality of travel wheels 52 and can include a single travel wheel axle 64 to accommodate the plurality of travel wheels 52 or multiple axles 64 to accommodate the plurality of travel wheels 52.

Figure 2:
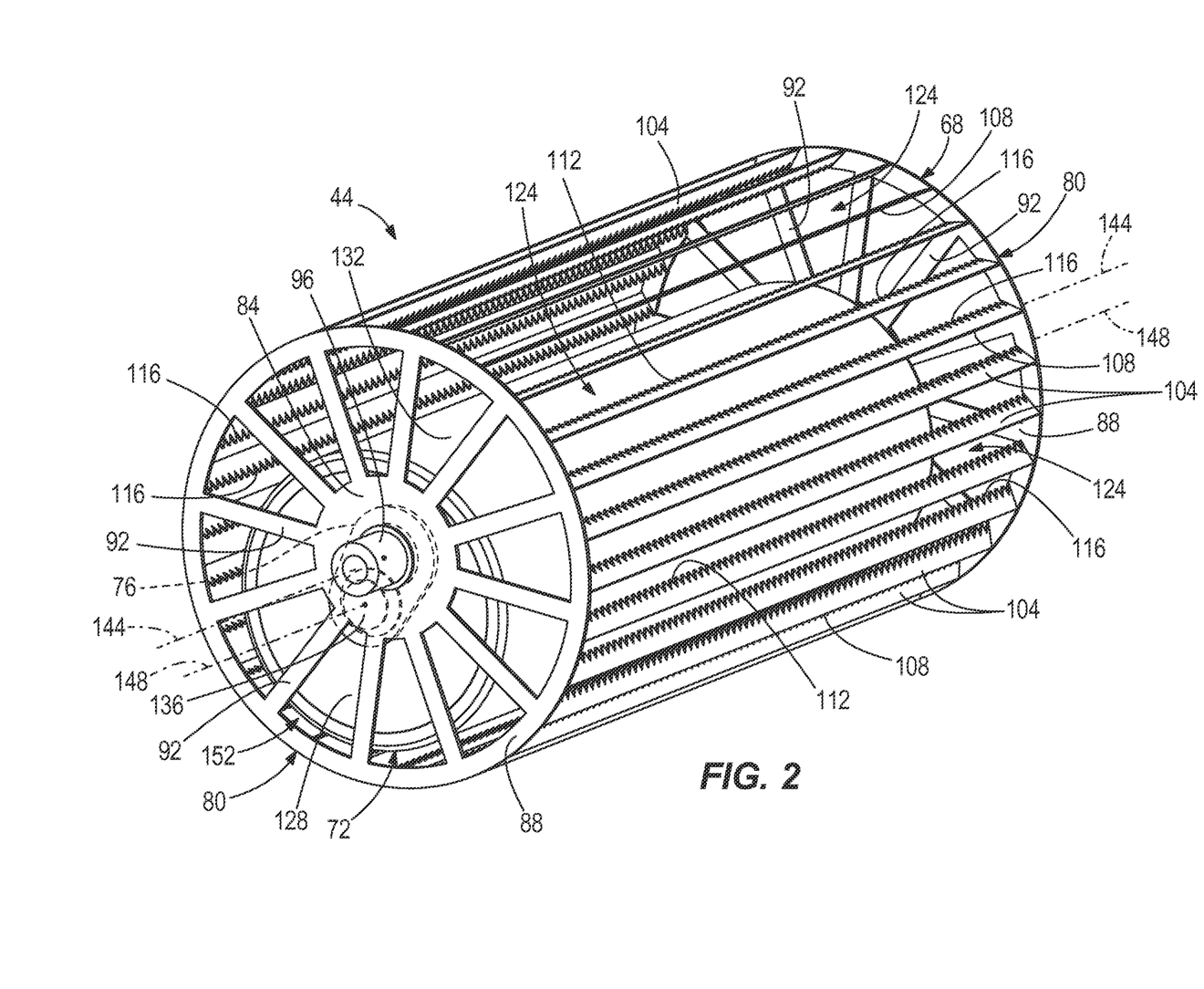
FIG. 2 is a top front perspective view of an exemplary roller assembly of the agricultural device illustrated in FIG. 1, in accordance with one embodiment.
Figure 3:
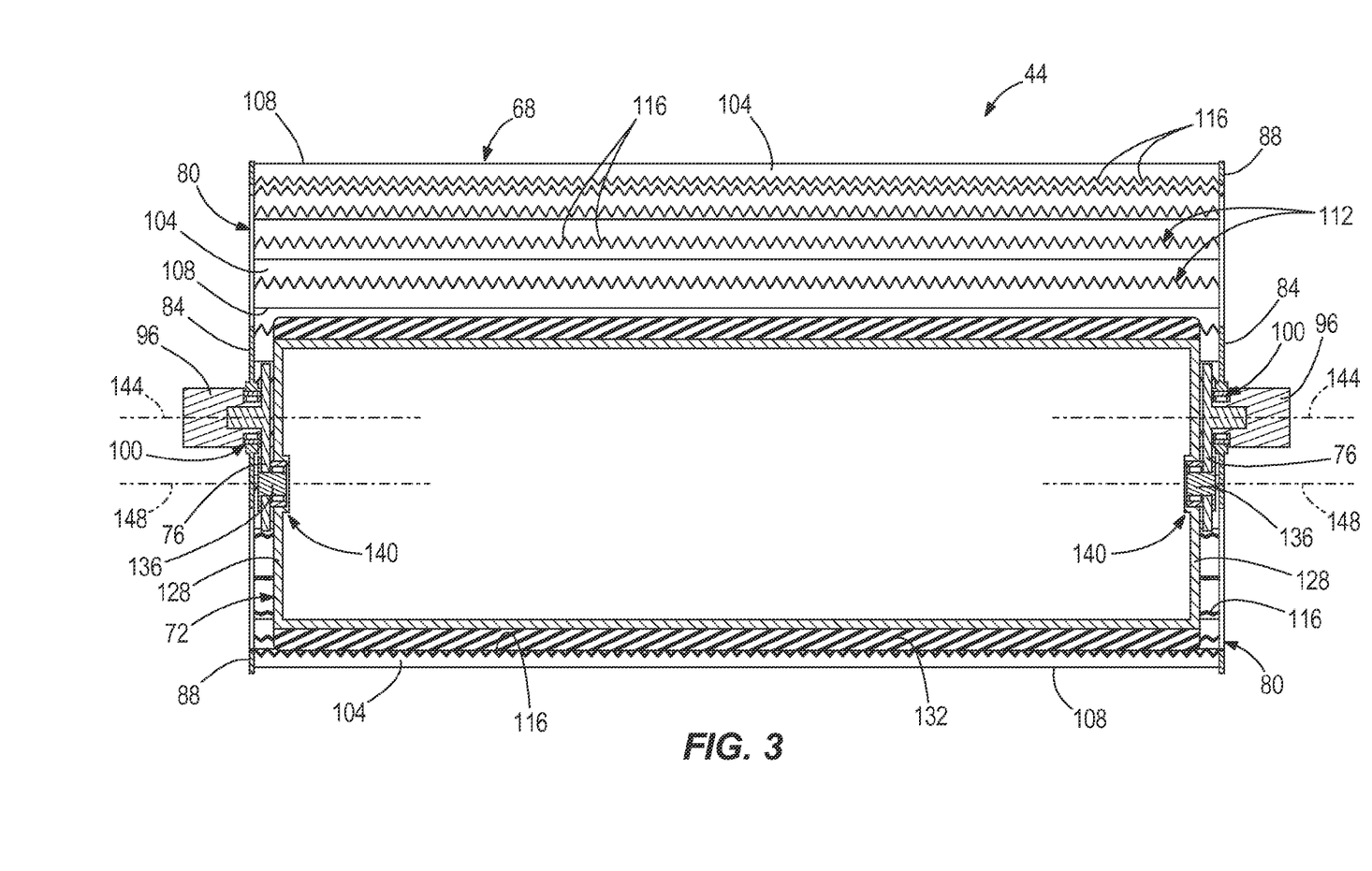
FIG. 3 is a cross-sectional view taken along line 3-3 in FIG. 1, in accordance with one embodiment.

With continued reference to FIG. 1 and additional reference to FIGS. 2 and 3, the roller assembly 44 includes an outer roller 68, an inner roller 72, and a coupling member 76 to couple the outer and inner rollers 68, 72 together. The outer roller 68 is larger in diameter than the inner roller 72. In some exemplary embodiments, the outer roller 68 can be between about 48 inches and about 60 inches in diameter and the inner roller 72 can be between about 50% and about 90% the size of the outer roller 68. Alternatively, the outer roller 68 and the inner roller 72 can have any size and be within the intended spirit and scope of the present disclosure.

The outer roller 68 includes a pair of end plates 80 with each end plate 80 including a hub 84, a circumferential portion or outer portion 88, and a plurality of spokes or radial support members 92 extending between the hub 84 and the outer portion 88 of the end plate 80. The outer roller 68 is rotatably coupled to the frame 36 via an outer roller axle 96 coupled to the hubs 84 of the two end plates 80. A bearing assembly 100 is positioned between the outer roller axle 96 and each end plate 80 to facilitate rotation of the end plates 80 relative to the outer roller axle 96.

Figure 5:
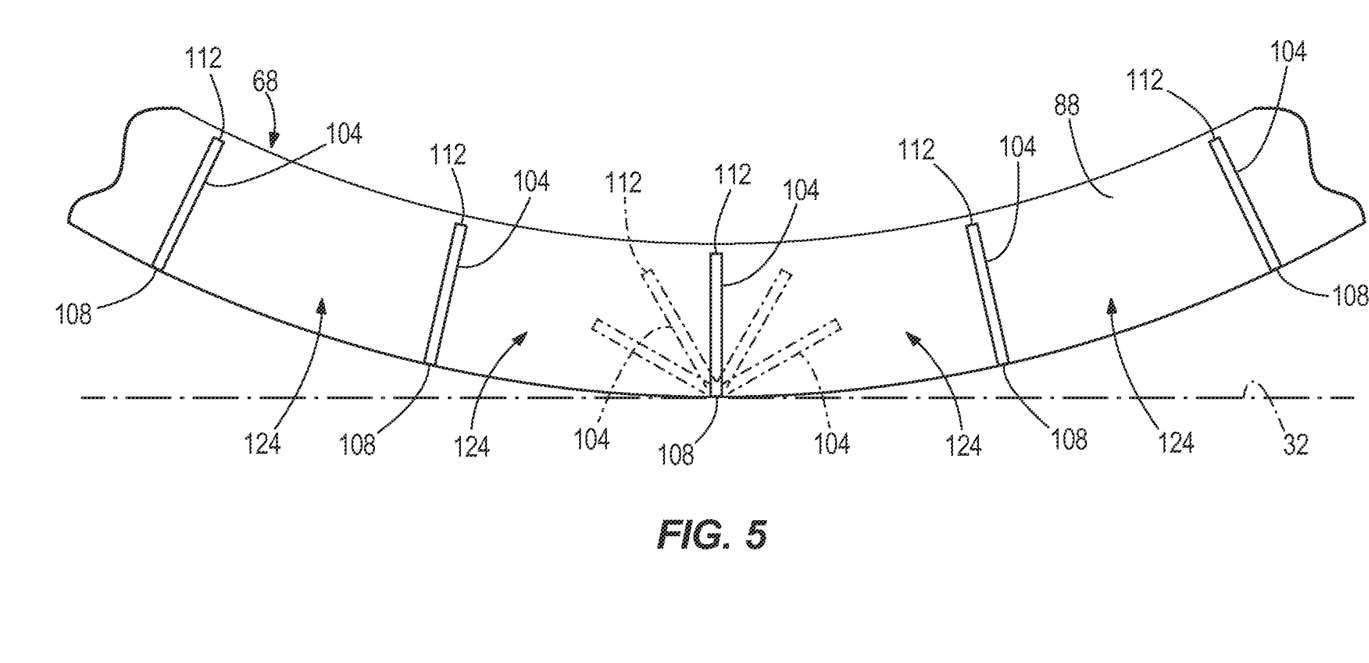
FIG. 5 is an elevational view of a portion of the roller assembly illustrated in FIG. 2, the portion of the roller assembly shows numerous embodiments and orientations of engagement members of the roller assembly, in accordance with one embodiment.

The outer roller 68 also includes a plurality of engagement members 104 extending between and coupled at their ends to the outer portions 88 of the end plates 80. In the illustrated exemplary embodiment, each engagement member 104 includes an outer edge 108 that is relatively flat and smooth, and an inner edge 112 that is serrated to provide a plurality of teeth 116 having a generally triangular shape. Alternatively, the inner edge 112 may also be flat and smooth, or the inner edge 112 may include teeth 116 having a different shape such as, for example, pyramid, conical, frusto-conical, semi-circular, semi-spherical, or any other polygonal or arcuately perimetered tooth shape. The engagement members 104 are also angled or raked forward. In the illustrated exemplary embodiment, the engagement members 104 are angled forward at about a 30 degree angle relative to a vertical plane 120 (see FIG. 1). Alternatively, and with reference to FIG. 5, the engagement members 104 may be oriented at different angles relative to the vertical plane 120. For example, the engagement members 104 may be angled or raked forward, angled or raked rearward, or may be vertically oriented (i.e., parallel to the vertical plane or radially aligned with or extending through a center of the outer roller). The engagement members 104 may be angled forward or rearward at any angle. For example, the engagement members 104 may be raked forward or rearward at about a 45-degree angle relative to the vertical plane 120 or they may be raked forward or rearward at about a 60-degree angle relative to the vertical plane 120. It should be understood that the engagement member 104 may be at any orientation relative to the vertical plane 120 and be within the intended spirit and scope of the present disclosure.

Referring back to FIGS. 1-3, the engagement members 104 are spaced-apart from each other to provide an opening 124 between each pair of engagement members 104. The openings 124 are adapted to receive the remnant stalks 28 during operation of the device 20. The engagement members 104 may be spaced-apart from each other at any distance. In some exemplary embodiments, the engagement members 104 may be spaced-apart about 8 inches. Alternatively, the engagement members 104 may be spaced-apart from each other between about 1 inch and about 36 inches or more.

The inner roller 72 is positioned within the outer roller 68 and includes a pair of end plates 128 and an exterior surface 132 extending between the end plates 128. The exterior surface 132 is adapted to engage or be positioned in close proximity to the inner edges 112 of the engagement members 104. The position of the inner roller 72 may be adjusted as desired to accommodate crop field conditions, treatment of the remnant crop stalks 28, and/or wear of the components of the roller assembly 44. The exterior surface 132 may be comprised of a resilient material adapted to accommodate contact with the inner edges 112 of the engagement members 104 and/or contact with the remnant stalks 28 during operation of the device 20. The resilient exterior surface 132 also inhibits binding of the two rollers 68, 72, and premature wearing of the exterior surface 132 of the inner roller 72 and the inner edges 112 or teeth 116 of the engagement members 104. The exterior surface 132 may be comprised of any resilient material such as, for example, rubber, plastic (hard or soft), etc.

The inner roller 72 is rotatably coupled to the outer roller 68 via the coupling member 76. In the illustrated exemplary embodiment, an inner roller axle 136 is coupled to the end plates 128 of the inner roller 72 and a bearing assembly 140 is positioned between the inner roller axle 136 and each end plate 128 to facilitate rotation of the inner roller 72 relative to the inner roller axle 136. The outer roller axle 96 and the inner roller axle 136 are coupled to a coupling member 76 at each end thereof. The outer roller axle 96 rotates about a first generally horizontal axis 144 and the inner roller axle 136 rotates about a second generally horizontal axis 148. In the illustrated exemplary embodiment, the second axis 148 is offset from the first axis 144 below and to a rear of the first axis 144. The second axis 148 may be offset to a rear of the first axis 144 by between about 1 degree to about 45 degrees relative to the vertical plane 120. Alternatively, the second axis 148 may be offset anywhere relative to the first axis 144. Additionally, the second axis 148 may be aligned and collinear with the first axis 144 such that the outer and inner rollers 68, 72 rotate about the same generally horizontal axis.

Operation of the agricultural device 20 will now be described. With continued reference to FIGS. 1-3, the agricultural device 20 is adapted to be pulled through a crop field for removal of remnant crop stalks 28 from the crop field. The lift mechanism 48 lowers the roller assembly 44 to an operating position, in which the bottom of the outer roller 68 engages the soil 32. In this position, the bottom of the outer roller 68 is positioned below the bottom of the travel wheel 52. Alternatively, the bottom of the outer roller 68 may be spaced above the soil 32, but low enough to engage the remnant stalks 28. The tractor 24 or other agricultural implement pulls the device 20 through a crop field. As the device 20 is pulled, the outer roller 68 rolls along the soil 32 (in a clockwise direction as illustrated in FIG. 1) and the remnant crop stalks 28 insert into the openings 124 between the engagement members 104. The remnant stalks 28 engage the exterior surface 132 of the inner roller 72, begin to bend over as the outer roller 68 rolls along the soil 32, and are pinched or compressed between the exterior surface 132 of the inner roller 72 and the inner edge 112 or teeth 116 of the engagement members 104. This pinching occurs at a pinch point 152. The teeth 116 assist with gripping, biting, puncturing, or otherwise deteriorating the remnant stalks 28. The engagement between the exterior surface 132 of the inner roller 72 and the stalks 28 and inner edges 112 of the engagement members 104 also rotate the inner roller 72 (in a clockwise direction as illustrated in FIG. 1). As the outer roller 68 continues to rotate along the soil 32, the inner roller 72 rotates with the outer roller 68 and continues to pinch the remnant stalks 28 between the two rollers 68, 72, thereby lifting the remnant stalks 28 from the soil 32 toward a rear of the roller assembly 44. Due to the size difference between the outer and inner rollers 68, 72, the exterior surface 132 of the inner roller 72 begins to be spaced-apart from the inner edges 112 of the engagement members 104 rearward of the pinch point 152. This spacing no longer provides compression or pinching to the remnant stalks 28 pulled from the soil 32 by the roller assembly 44. Thus, the remnant stalks 28 are released by the roller assembly 44 and fall back to a surface of the soil 32 behind the roller assembly 44. By positioning the pinch point 152 to a rear of the ground contact point of the outer roller 68, a natural lifting and pulling motion is created as the outer roller 68 rolls over the ground and the stalk 28 remains pinched between the outer and inner rollers 68, 72. This lifting and pulling motion provides for minimal soil 32 disruption.

During removal of the remnant stalks 28, the stalks 28 are also crushed, splintered, or otherwise deteriorated between the inner roller 72 and the inner edges 112 and teeth 116 of the engagement members 104. Crushing, splintering, and other forms of deteriorating remnant stalks 28 accelerate decomposition of the stalks 28.

Figure 4:
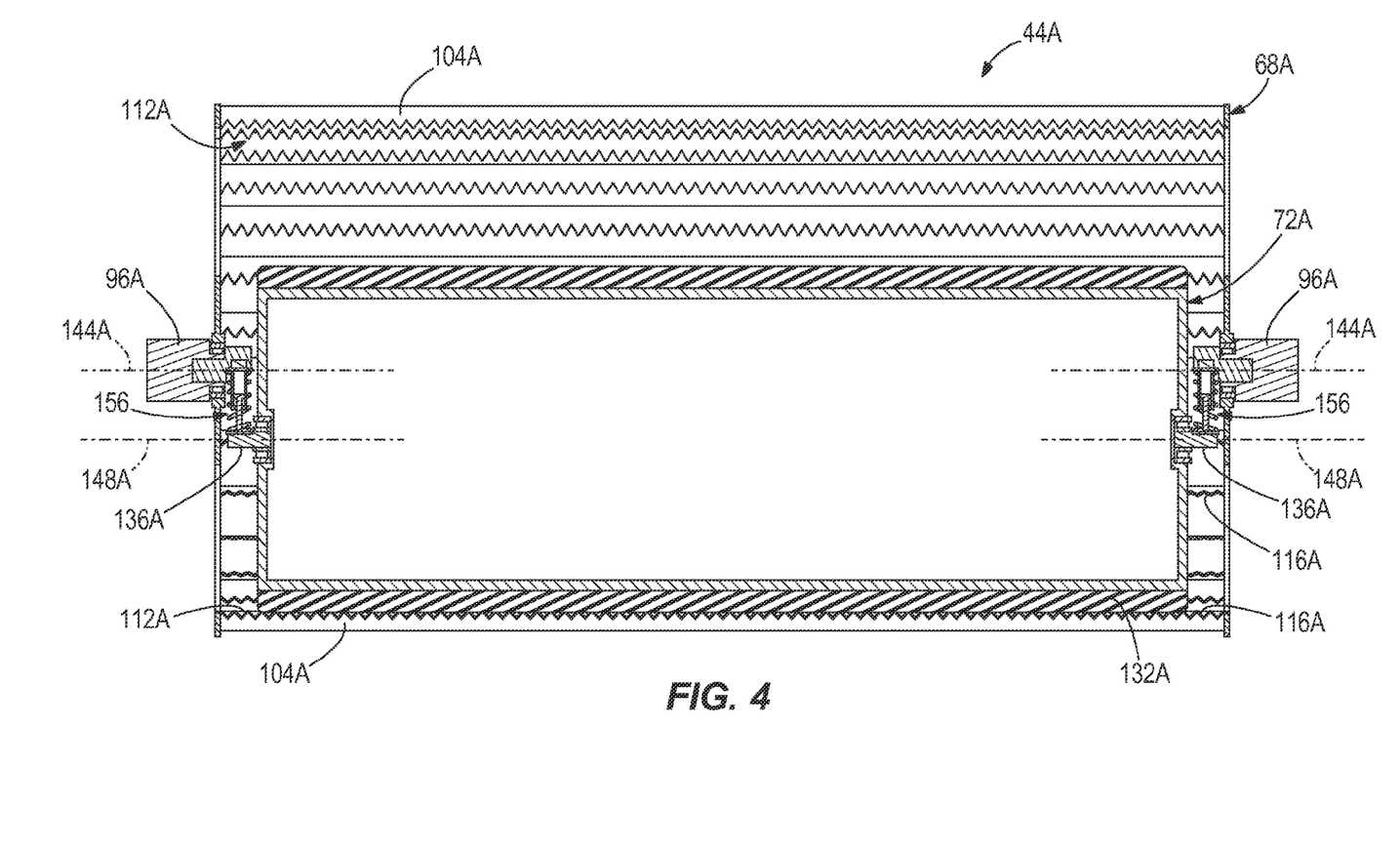
FIG. 4 is a cross-sectional view similar to FIG. 3 showing another exemplary roller assembly, in accordance with one embodiment.

Referring now to FIG. 4, another exemplary embodiment of the roller assembly 44A is illustrated. The roller assembly 44A includes similarities to the roller assembly 44 illustrated in FIGS. 1-3 and such similarities are identified with the same reference number and an "A".

In this exemplary embodiment, the roller assembly 44A includes a pair of biasing members 156 adapted to bias the inner roller 72A against the inner edges 112A of the engagement members 104A. As the device 20A is pulled over a crop field, the terrain is usually not perfectly flat and more likely is going to include rocks, uneven soil, tire ruts, trenches, or other types of height changes in the terrain. As the outer roller 68A travels over these items, the outer roller 68A is jarred or otherwise receives shocks or forces applied thereto, which may force the inner roller 72A out of engagement with the inner edges 112A of the engagement members 104A. However, the biasing members 156 apply an opposing biasing force to the inner roller 72A to assist with ensuring consistent and reliable contact between the exterior surface 132A of the inner roller 72A and the inner edges 112A of the engagement members 104A. The biasing members 156 may be any type of biasing member such as, for example, hydraulic devices, pneumatic devices, mechanical devices (e.g., metal spring or other biasing member), etc. A biasing member 156 may be positioned on each end of the roller assembly 44A between the outer roller axle 96A and the inner roller axle 136A. Alternatively, the biasing members 156 may be coupled between the outer and inner rollers 68A, 72A in any manner and all of such possibilities are intended to be within the spirit and scope of the present disclosure.

Figure 6:
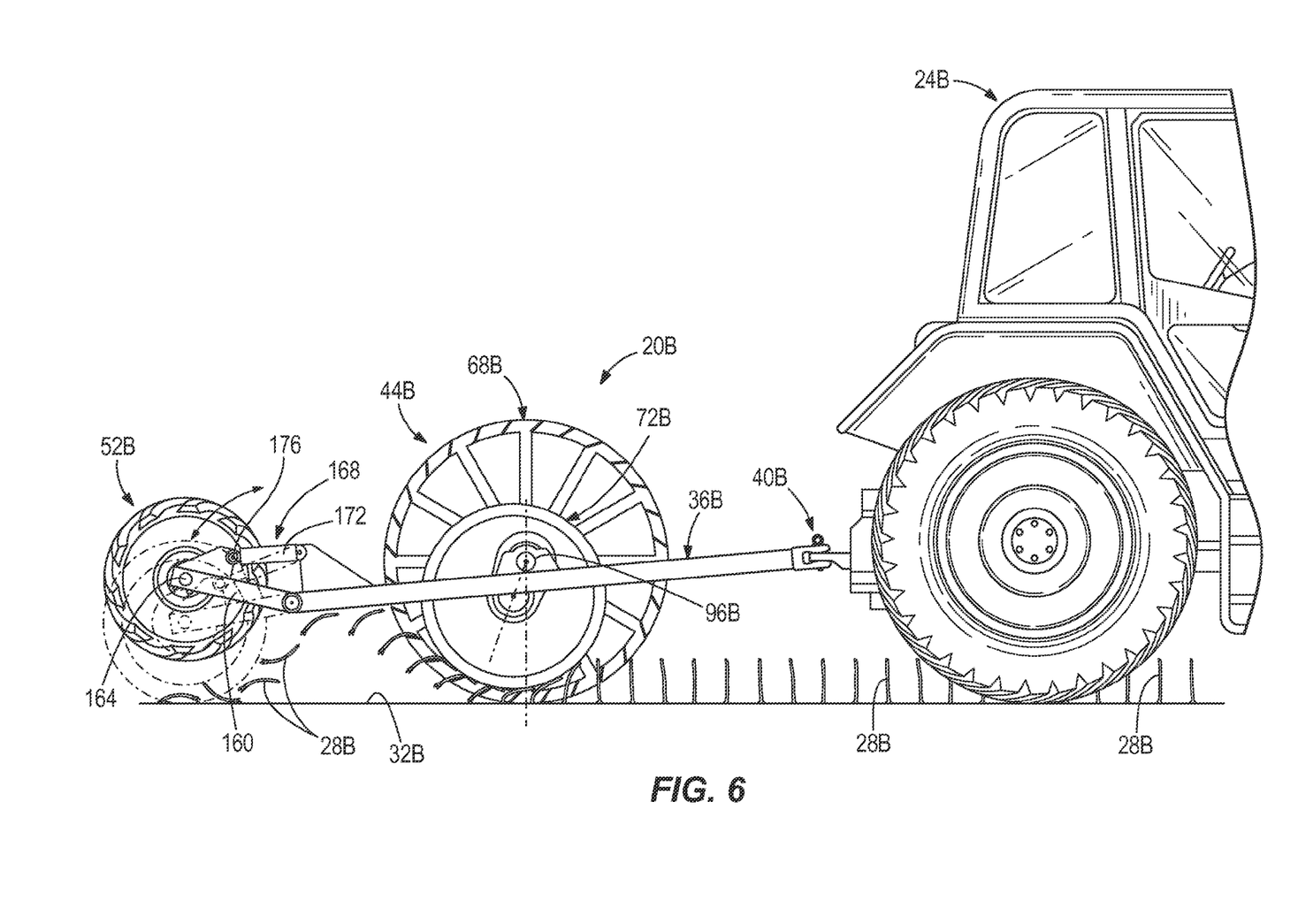
FIG. 6 is an elevational view of another exemplary agricultural device including principles of the disclosure, the agricultural device is being pulled by an exemplary tractor, in accordance with one embodiment.

With reference to FIG. 6, another exemplary agricultural device 20B is illustrated. The agricultural device 20B includes similarities to the agricultural devices 20, 20A illustrated in FIGS. 1-5 and such similarities are identified with the same reference number and a "B".

The agricultural device 20B includes a frame 36B, a roller assembly 44B and a travel wheel 52B. The frame 36B includes a hitch or coupling member 40B at a front thereof and the travel wheel 52B coupled to a rear thereof. The roller assembly 44B is rotatably coupled to the frame 36B between the hitch 40B and the travel wheel 52B. The roller assembly 44B is similar in structure and function to the roller assembly 44 illustrated in FIGS. 1-3, except the roller assembly 44B illustrated in FIG. 6 is not coupled to a lift mechanism. Rather, the roller assembly 44B illustrated in FIG. 6 is a generally vertically fixed relative to the frame 36B by having an outer roller axle 96B coupled to the frame 36B.

The device 20B includes a travel wheel arm 160 rotatably coupled to the frame 36B and the travel wheel 52B is rotatably coupled to the travel wheel arm 160 via a travel wheel axle 164. The device 20B also includes a lift mechanism 168 coupled between the frame 36B and the travel wheel arm 160 for vertically moving the travel wheel 52B. The lift mechanism 168 can be wide variety of different types of mechanisms adapted to vertically move the travel wheel 52B. In the illustrated exemplary embodiment, the lift mechanism 168 includes a cylinder 172 coupled to the frame 36B and a piston arm 176 coupled to the travel wheel arm 160 and moveable within and along the cylinder 172. The piston arm 176 may be powered for movement in a variety of different manners, all of which are intended to be within the spirit and scope of the present disclosure. For example, the piston arm 176 may be driven by hydraulics, pneumatics, screw drive, or any other type of power capable of moving the piston arm 176 relative to the cylinder 172. The lift mechanism 168 is adapted to move the travel wheel 52B from a first position, in which the travel wheel 52B engages the soil 32B and elevates the roller assembly 44B above the soil 32B, to a second position, in which the travel wheel 52B is moved upward out of engagement with the soil 32B and the roller assembly 44B is allowed to contact the soil 32B. When the roller assembly 44B is not is use and/or is traveling on surfaces other than crop fields, it may be desirable to have the travel wheel 52B contact the ground surface instead of the roller assembly 44B. This inhibits the roller assembly 44B from prematurely wearing out or being damaged. In the illustrated exemplary embodiment, the device 20B includes a single travel wheel 52B and associated components. In other embodiments, the device 20B includes a plurality of travel wheels 52B and associated components to facilitate use of the plurality of travel wheels 52B.

Figure 7:
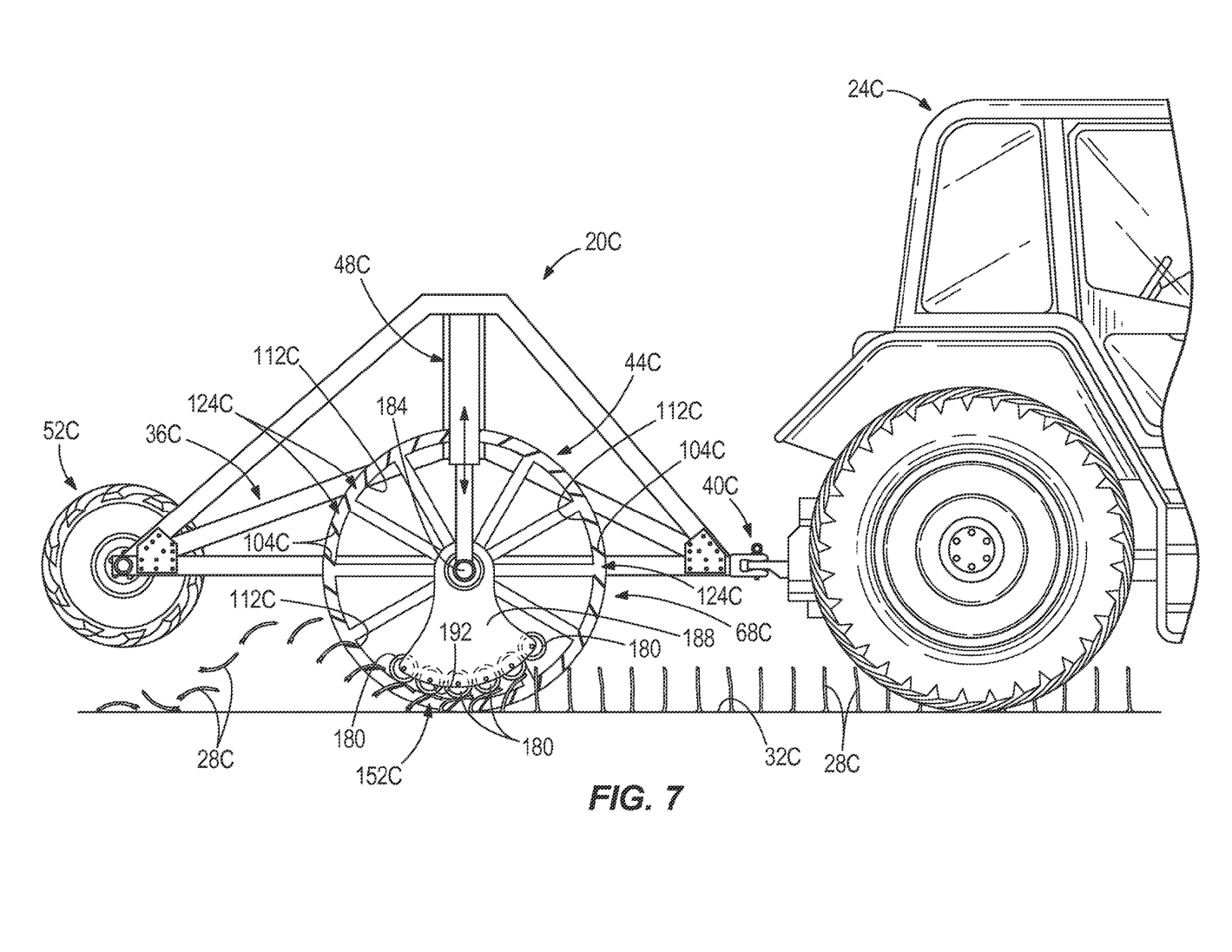
FIG. 7 is an elevational view of a further exemplary agricultural device including principles of the disclosure, the agricultural device is being pulled by an exemplary tractor, in accordance with one embodiment.

Referring now to FIG. 7, yet another exemplary agricultural device 20C is illustrated. The agricultural device 20C includes similarities to the agricultural devices 20, 20A, 20B illustrated in FIGS. 1-6 and such similarities are identified with the same reference number and a "C".

The roller assembly 44C of this agricultural device 20C includes an outer roller 68C and a plurality of inner rollers 180. The outer roller 68C is rotatably coupled to the frame 36C by a roller axle 184 and the inner rollers 180 are rotatably coupled to a support member 188. The positions of the plurality of inner rollers 180 may be independently adjusted relative to the support member 188 to accommodate crop field conditions, treatment of the remnant crop stalks 28C, and/or wear of the components of the roller assembly 44C. In the illustrated exemplary embodiment, the support member 188 is rigidly fixed to the frame 36C, thereby preventing rotation of the support member 188 relative to the frame 36C. In other exemplary embodiments, the support member 188 is also rotatably coupled to the frame 36C with the roller axle 184.

The plurality of inner rollers 180 are substantially smaller than the outer roller 68C in this illustrated embodiment and are also substantially smaller than the inner roller 72, 72A, 72B of other embodiments illustrated and described herein. The plurality of rollers 180 are rotatably coupled near an outer edge 192 of the support member 188 and are incrementally positioned closer to inner edges 112C of the engagement members 104C until at least one of the rollers 180, near the rear of the roller assembly 44C, contact the inner edges 112C of the engagement members 104C. This contact between the inner edges 112C of the engagement members 104C and at least one of the inner rollers 180 creates a pinch point 152C similar to the pinch point 152 described above in connection with the agricultural device 20 illustrated in FIGS. 1-3.

During operation, the outer roller 68C rolls along the top of the soil 32C, the support member 188 remains fixed relative to the outer roller 68C, and the remnant stalks 28C insert into the openings 124C defined between the engagement members 104C and engage the plurality of rollers 180. The stalks 28C are bent over and ultimately pinched between at least one of the inner rollers 180 and inner edges 112C of the engagement members 104C. Continued rotation of the outer roller 68C along the soil 32C and the pinching of the stalks 28C pull the remnant stalks 28C from the soil 32C. The remnant stalks 28C are released after they pass the rearmost inner roller 180 and fall back to the surface of the soil 32C for decomposition.

It should be understood that the agricultural devices of the present disclosure are capable of including devices other than the inner rollers illustrated and described herein to pinch or compress remnant stalks against the inner edges of the engagement members. For example, the agricultural devices may include a non-rotating fixed shoe positioned in the outer roller to provide a pinch point similar to the other embodiments. The shoe includes a curved front surface that leads into the pinch point to guide the remnant stalks toward and into the pinch point. The shoe may also include a curved rear surface behind the pinch point to provide for release of the stalks after they are pulled from the soil. The shoe may provide the pinch point at a similar rear position as the other embodiments, or may provide the pinch point at any other location. Since the shoe will be fixed relative to the outer roller and will contact the inner edges of the engagement members, the shoe may include an engagement surface made of a material adapted to handle such repeated engagement. For example, the shoe may be made of ultra-high molecular weight (UHMW) plastic, HDPE, polypropylene, "rhino hide", various other types of plastic, various types of rubber, or any resilient material capable of withstanding such conditions.

In the illustrated exemplary embodiments included herein, the outer roller of the roller assembly contacts the soil or ground surface. It should be understood that the outer roller can be positioned above and out of contact with the soil during operation, but still engage remnant crop stalks to remove the stalks from the soil. The outer roller may be positioned above the soil in a variety of different manners. In one embodiment, the frame may be configured to support the outer roller above the soil. In another embodiment, the lifting mechanism can lift and hold the outer roller above the soil during operation. In still another embodiment, the travel wheel and associated lift mechanism can engage the soil to lift and support the outer roller above the soil. A variety of other manners exist for positioning the outer roller above and out of contact with the soil during operation and all of such possibilities are intended to be within the spirit and scope of the present disclosure.

The illustrated exemplary embodiments herein also disclose the engagement of the outer roller with the soil and remnant crop stalks as the driving force for rotating the outer and inner rollers. It should be understood that the agricultural device may include one or more drive mechanisms coupled to one or both of the inner and outer rollers to rotate the rollers during operation of the agricultural device. The drive mechanisms may be any type of drive mechanism.

It should be understood that the agricultural devices disclosed herein provide a benefit of not requiring precise alignment with rows of remnant stalks. Rather, the agricultural devices are merely pulled across the crop field and any row of remnant crop stalk positioned within the width of the roller assembly will be removed from the soil. This makes it easier for the operator to operate the agricultural devices, which decreases the amount of time required to remove remnant crop stalks.

It should also be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the agricultural devices may be utilized in any orientation and use of such terms is intended to correspond to the exemplary orientation of the agricultural devices illustrated in the drawings. The use of these terms in association with the agricultural devices is not intended to limit the agricultural devices to a single orientation or to limit the agricultural devices in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention.

The invention claimed is:

1. An agricultural device comprising:
a frame including a hitch; and
a roller assembly coupled to the frame, the roller assembly including
an outer roller including a pair of end plates and a plurality of spaced-apart engagement members extending between and coupled to the end plates, wherein each of the engagement members including an inner edge extending into the outer roller, and wherein the outer roller is rotatably coupled to the frame, and
an inner roller positioned in the outer roller and including a pair of end plates and an exterior surface extending between the end plates, wherein the inner roller is rotatably coupled to the outer roller and the inner edges of the engagement members are adapted to be positioned proximate the exterior surface of the inner roller;
wherein the inner edges of the engagement members are at least partially serrated.

2. The agricultural device of claim 1, wherein the inner edges of the engagement members engage the exterior surface of the inner roller.

3. The agricultural device of claim 2, wherein the inner edges of the engagement members engage the exterior surface of the inner roller toward a rear of the roller assembly.

4. The agricultural device of claim 1, further comprising a lift mechanism coupled to the frame and the roller assembly to vertically move the roller assembly.

5. The agricultural device of claim 4, wherein the lift mechanism moves the roller assembly between an operating position, in which the outer roller engages soil, and an inoperative position, in which the outer roller is positioned above and out of contact with the soil.

6. The agricultural device of claim 1, further comprising a travel wheel rotatably coupled to the frame and adapted to engage a ground surface.

7. The agricultural device of claim 6, further comprising a lift mechanism coupled to the travel wheel to move the travel wheel vertically into and out of contact with a ground surface.

8. The agricultural device of claim 1, wherein a position of the inner roller is adjustable relative to the outer roller.

9. An agricultural device comprising:
a frame including a hitch; and
a roller assembly coupled to the frame, the roller assembly including
an outer roller including a pair of end plates and a plurality of spaced-apart engagement members extending between and coupled to the end plates, wherein each of the engagement members including an inner edge extending into the outer roller, and wherein the outer roller is rotatably coupled to the frame, and
an inner roller positioned in the outer roller and including a pair of end plates and an exterior surface extending between the end plates, wherein the inner roller is rotatably coupled to the outer roller and the inner edges of the engagement members are adapted to be positioned proximate the exterior surface of the inner roller;

wherein the exterior surface of the inner roller is at least partially made of a resilient material.

10. The agricultural device of claim 9, wherein a position of the inner roller is adjustable relative to the outer roller.

11. An agricultural device comprising:

a frame including a hitch; and a roller assembly coupled to the frame, the roller assembly including an outer roller including a pair of end plates and a plurality of spaced-apart engagement members extending between and coupled to the end plates, wherein each of the engagement members including an inner edge extending into the outer roller, and wherein the outer roller is rotatably coupled to the frame, and an inner roller positioned in the outer roller and including a pair of end plates and an exterior surface extending between the end plates, wherein the inner roller is rotatably coupled to the outer roller and the inner edges of the engagement members are adapted to be positioned proximate the exterior surface of the inner roller;

wherein the outer roller rotates about a first axis and the inner roller rotates about a second axis offset from the first axis; and wherein the second axis is positioned below and to a rear of the first axis based on a direction of travel of the agricultural device.

12. The agricultural device of claim 11, wherein a position of the second axis is adjustable relative to the first axis.

13. An agricultural device comprising:

a frame including a hitch; and a roller assembly coupled to the frame, the roller assembly including a first roller defining an internal cavity and including at least one engagement member, wherein the engagement member includes an inner edge extending into the internal cavity of the first roller, and wherein the first roller has a first diameter and is rotatably coupled to the frame, and a second roller at least partially positioned in the internal cavity of the first roller and including an exterior surface, wherein the first roller is rotatably coupled to the second roller and the inner edge of the engagement member is adapted to be positioned proximate the exterior surface of the second roller, and wherein the second roller has a second diameter smaller than the first diameter;

wherein the first roller rotates about a first axis and the second roller rotates about a second axis offset from the first axis; and wherein the second axis is positioned below and to a rear of the first axis based on a direction of travel of the agricultural device.

14. The agricultural device of claim 13, wherein the first roller includes a plurality of engagement members and each of the plurality of engagement members include an inner edge, and wherein inner edges of the plurality of engagement members are adapted to be positioned proximate the exterior surface of the second roller.

15. The agricultural device of claim 13, wherein the inner edge of the engagement member is at least partially serrated.

16. The agricultural device of claim 13, wherein the inner edge of the engagement member engages the exterior surface of the second roller.

17. The agricultural device of claim 16, wherein the inner edge of the engagement member engages the exterior surface of the second roller toward a rear of the roller assembly.

18. The agricultural device of claim 13, wherein the exterior surface of the second roller is at least partially made of a resilient material.

19. The agricultural device of claim 13, wherein the second roller is one of a plurality of second rollers, wherein each of the plurality of second rollers include an exterior surface that is adapted to be positioned proximate the inner edge of the engagement member.

20. The agricultural device of claim 13, wherein a position of the second axis is adjustable relative to the first axis.

* * * * *